Figures 1, 2:
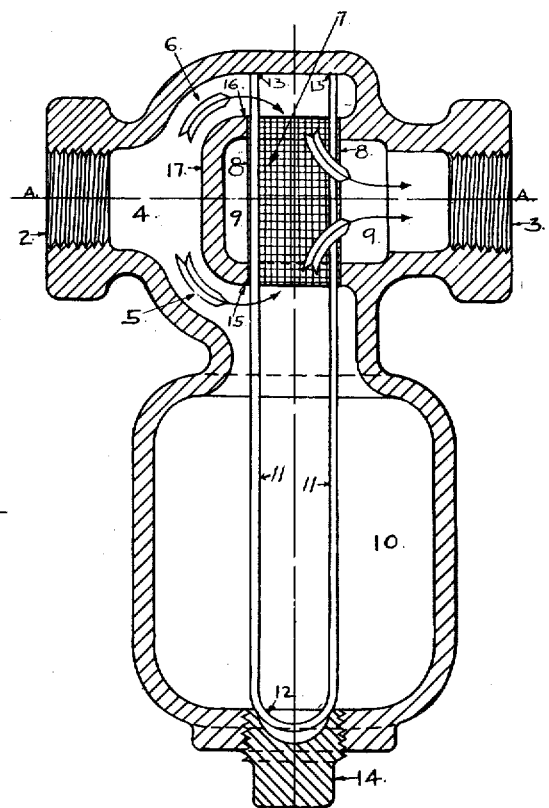

June 10, 1924.

A. W. CASH

STRAINER

Filed Aug. 2, 1920

1,496,771

WITNESSES: H H Shugart
Geo. S. Hale

Arthur W. Cash
INVENTOR

Patented June 10, 1924.

1,496,771

UNITED STATES PATENT OFFICE.

ARTHUR W. CASH, OF DECATUR, ILLINOIS, ASSIGNOR, BY MESNE ASSIGNMENTS, TO A. W. CASH COMPANY, A CORPORATION OF DELAWARE.

STRAINER.

Application filed August 2, 1920. Serial No. 400,795.

*To all whom it may concern:*

Be it known that I, ARTHUR W. CASH, a citizen of the United States, residing in the city of Decatur, county of Macon, and State of Illinois, have invented a new and useful Improvement in Strainers, of which the following is a specification.

My invention relates more particularly to a class of devices commonly used on pipes or conduits to separate the flow of fluids therethrough from foreign substances, and commonly known as strainers.

One object of the invention is to provide a device that will effectively separate and retain foreign substances quite commonly entrained in fluids such as scale, cuttings, grit and fibrous particles of material sometimes used in making up joints in the pipes or conduits. The construction of the strainer element being such that the flow of fluids therethrough will separate and deposit the foreign substance into a lower adjoining sediment chamber without ordinarily clogging the strainer element, and thereby impeding or restricting the fluid flow.

Another object is to provide a device that while being very effective, is yet simple and inexpensive in manufacture and constructed in such manner as will readily permit of emptying the sediment chamber when it becomes filled, or ready removal and cleansing of the strainer element whenever clogged by abnormal quantities of fibrous or other clinging foreign matter, or when worn from long continued service.

Accomplishment of the objects set forth is shown in the construction embodied in the accompanying drawings in which, Fig. 1, is a central vertical section through a strainer having an inlet pipe or conduit connection at 2, and outlet pipe or conduit connection at 3.

Fig. 2 is a horizontal section on line A—A through central upper chambered portion of the strainer looking downward.

Reference letters and figures refer to similar parts throughout the drawings and specifications.

In Fig. 1, fluid enters inlet end 2, into chamber 4, thence dividing, a portion flows downward through curved passage way 5, while the other portion flows upward through curved passage way 6, both fluid streams again uniting in the central chamber 7, of screen member 8, which entirely surrounds central chamber 7.

Inlet chamber 4, and connecting dependent sediment chamber 10, are separated from outlet chamber 9, by the two parallel walls 15 and 16, and their curved connecting wall 17, walls 15 and 16, having apertures to receive and retain cylindrical shaped screen member 8.

From central chamber 7, of screen member 8, the fluid must all pass through the meshes to enter and flow from the outlet chamber 9, and on through outlet connection at 3. During the flow of fluid, all foreign matter that is too large to pass through the meshes of the screen member 8, will fall below into sediment chamber 10, if of greater specific gravity than the fluid, while foreign matter of less specific gravity than the fluid and which may be retained within cylindrical shaped screen 8, will be churned in the vortex of the two uniting streams until worn to such size or condition that it will pass through the meshes of the screen 8.

A looped wire member having parallel sides 11—11 united by the lower curved portion 12, pass upward internally of cylindrical screen 8, which is fastened to the parallel sides 11—11, in any suitable manner, as by solder, the two parallel sides 11—11, further extending upward and terminating in the ends 13—13, which abut the inner surface of the upper portion of body casing in such manner that screen member 8, is retained as against further upward movement. The lower looped portion 12 of the wire member resting within the cup shaped inner end of screw threaded plug 14, effectually prevents downward movement of screen 8, which is, therefore, retained in its correct operative position. When it is desired to remove the screen member 8, for cleaning or renewal, it is accomplished by removal of screw threaded plug 14, thus permitting withdrawal of wire supporting member with screen member 8, attached to the parallel sides 11—11, thereof. It may readily be seen that when screw threaded plug 14 is removed for withdrawal of screen member 8, that sediment chamber 10, may at the same time be readily freed from any deposit of foreign matter before replacement of screen member 8, and screw threaded plug 14. The partition which separates the inlet and outlet chambers and which includes spaced opposite walls and a connecting wall, extends solely from the outlet side of the casing and terminates short of the inlet side to provide two separate passages around the casing to the openings in the said opposite walls in which the ends of the screen 7 are fitted. This construction divides the water, permitting the incoming water to enter each end of the screen at the said openings of the partition.

In installations where there might be excessive amounts of foreign matter that would quickly fill the sediment chamber 10, necessitating frequent emptying or cleaning, a piece of screw threaded pipe or conduit of any desired length may be substituted for the screw threaded plug 14, and if the pipe or conduit be supplied with a cock or valve at its extended end, it is evident that both the sediment chamber 10, and the extended pipe or conduit could be very quickly cleared or cleansed of any accumulation of foreign matter without necessity of first shutting off the flow of fluid as would be necessary when using the strainer equipped with screw threaded plug 14.

Having described my improved strainer, I claim,

1. As an article of manufacture, a strainer, including, in combination, a casing having inlet and outlet connections, inlet and outlet chambers adjacent said connections, a partition separating said inlet and outlet chambers, said partition including two spaced and opposed walls and a connecting wall, said opposed walls each having an aperture therein, a sediment chamber connected to said inlet chamber, and a closure for said sediment chamber, an open ended strainer positioned in said outlet chamber and having its ends fitting said apertures, and means for removably holding said strainer in position, said means including a wire member looped to form parallel arms, said parallel arms being secured within said strainer and the free ends extending above the strainer and abutting the inner surface of the upper part of the casing to hold the strainer in proper position, the loop of said holding means being engaged and supported by said closure for the sediment chamber, whereby the strainer is supported.

2. A device of the character described, including, in combination, a casing having an inlet and an outlet passage and also having a sediment chamber in communication with said inlet passage, a removable closure for said sediment chamber, a wall having upper and lower horizontal parts and a connecting vertical part to provide a chamber communicating with said outlet passage, said upper and lower horizontal parts of said wall each having an opening therethrough, a strainer member removably mounted within said chamber and having its ends fitting said openings, said strainer member being open ended, and means for holding the strainer member in place, said means including a resilient member secured to the inside of said strainer and having a part projecting above the same for engagement with the inside surface of the outside wall of the casing to space the strainer therefrom and properly position the strainer in the openings, and said looped resilient member also having a part projecting below the strainer into engagement with the closure for the sediment chamber, whereby the strainer is supported in position.

3. A device of the character described, including, in combination, a casing having an inlet and an outlet passage and also having a sediment chamber in communication with said inlet passage, a removable closure for said sediment chamber, a wall having upper and lower horizontal parts and a connecting vertical part to provide a chamber communicating with said outlet passage, said upper and lower horizontal parts of said wall each having an opening therethrough, a strainer member removably mounted within said chamber and having its ends fitting said openings, said strainer member being open ended, and means for holding the strainer member in place, said means including a resilient member having two parallel arms and a connecting loop at one end, said arms being secured to the inside of the strainer and having their free ends projecting above the same for engagement with the inside surface of the outside wall of the casing, said closure for the sediment chamber engaging the loop, whereby the strainer is removably supported in place.

ARTHUR W. CASH.

Witnesses:
H. H. SHUGART,
GEO. S. HALE.